UNITED STATES PATENT OFFICE.

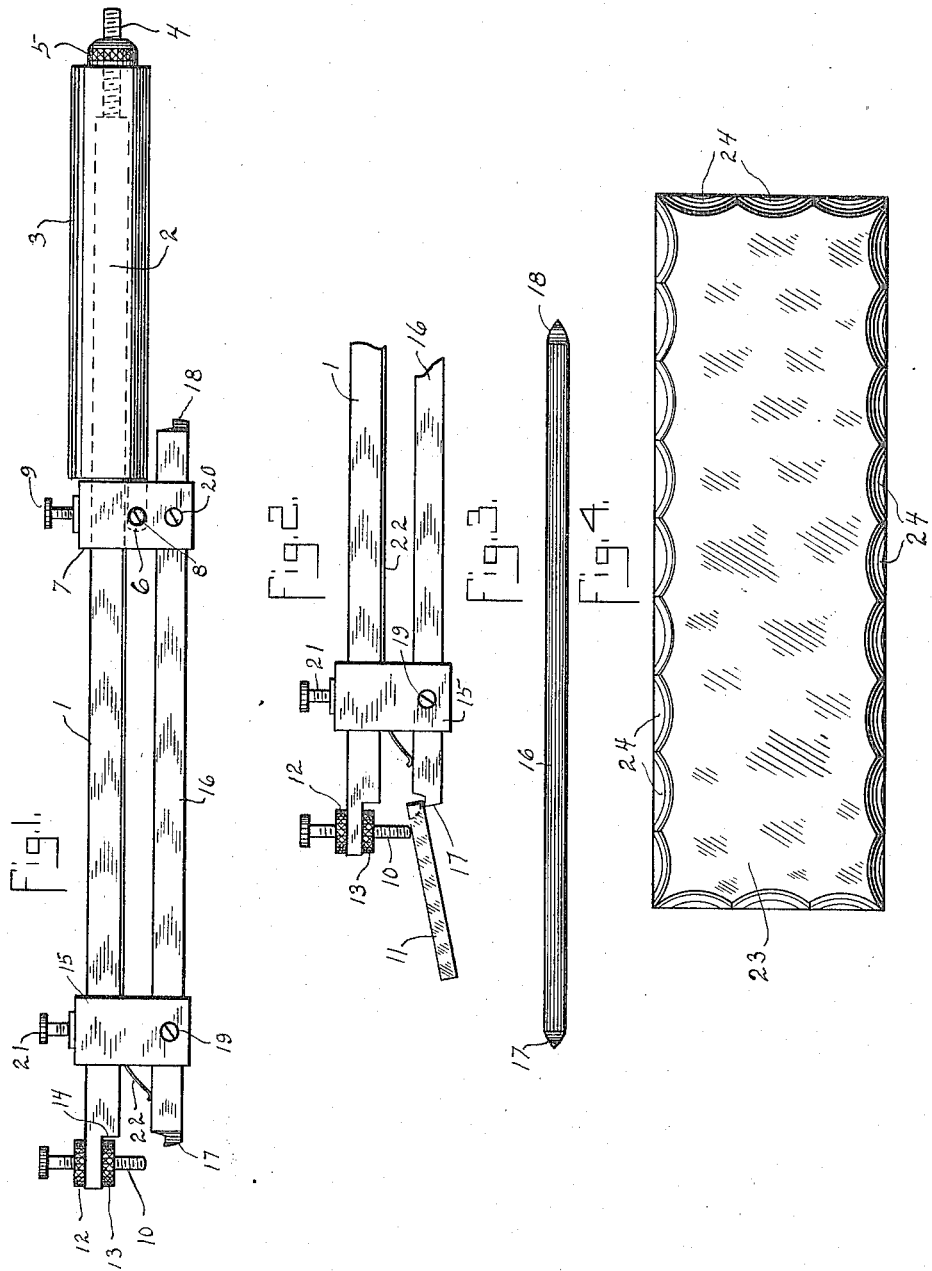

WILLIAM SPANGLER, OF ROCK FALLS, ILLINOIS.

GLASS-CHIPPING TOOL.

1,162,815.  Specification of Letters Patent.  Patented Dec. 7, 1915.

Application filed December 26, 1914. Serial No. 879,066.

*To all whom it may concern:*

Be it known that I, WILLIAM SPANGLER, a citizen of the United States, residing at Rock Falls, in the county of Whiteside and State of Illinois, have invented certain new and useful Improvements in Glass-Chipping Tools, of which the following is a specification.

My invention pertains to glass chipping tools, and has for its purpose the chipping or breaking away of a small portion of the edge of a glass plate, for ornamental purposes, when such plate is to be used for a door-plate, sign or similar purpose. For producing plates of the kind described it is usual to use the heavier kinds of glass, and on account of the comparatively small size of the plate, it is frequently possible to use pieces of scrap glass. These, however, are of varying thicknesses, and a tool which will operate satisfactorily on a piece of glass of one thickness will not produce the desired results on a glass of another thickness, and is likely to damage or break the same. The chipping is usually accomplished by engaging the edge of the glass between a bearing point and a bit, provided with a tooth or point to perform the chipping. In order that a tool which will operate successfully with one thickness of glass will also do the work satisfactorily with that of another thickness, it is necessary that the space between the bearing point and bit shall be increased, transversely of the edge of the glass, and also that the space be increased in the other direction, so that the bearing point shall impinge the glass at a greater distance from the edge thereof than when used with the thinner piece.

The chief purpose of my invention is to provide for such a double adjustment of the jaws, so that the same may be arranged to act perfectly with varying thicknesses of glass. This and other advantages of my device will more fully appear from the following specification, reference being had to the drawings accompanying the same, wherein;

Figure 1 shows my invention, in side elevation. Fig. 2 is a detail of the chipping head, with a piece of glass in position therein, to be operated upon. Fig. 3 shows the bar 16, detached, in plan view. Fig. 4 is a plan view of a glass plate, the edges of which have been chipped with a chipping tool.

1 represents a bar, provided with a shank 2, slidable within a handle 3, and provided at its outer end with a threaded portion 4, upon which a nut 5 is operable, to hold the bar 1 in adjusted position with relation to the handle. The inner end of the handle 3 is provided with a projection 6 which is secured in a clamp-plate 7 by means of a bolt 8. In the upper part of the clamp-plate is a set-screw 9, capable of holding the bar 1 tightly against the part 6. In the outer end of the bar 1 is vertically movable a screw 10, the small end of which provides a bearing point for engagement with the upper face of the glass 11, (Fig. 2) such screw being firmly held in position by lock-nuts 12 and 13, the last-named nut being accommodated by a recess 14 in the end of the bar 1.

Mounted on the bar 1 is a housing 15, in the lower part of which is secured one end of a bar 16, the other end of which is fixed in the lower part of the clamp-plate 7. At its outer end the bar 16 is provided with a point or bit 17, in proximity to the bearing screw 10, and the opposite end of the bar 16 may be provided with a point 18, which may be used interchangeably with the point 17. To permit of this the bar 16 is removably held in place, as by bolts 19 and 20. The space between the outer ends of the bars 1 and 16 can be varied by means of a set-screw 21 in a similarly threaded opening in the upper part of the housing 15, and having a bearing against the upper face of the bar 1. By turning the screw 21 inwardly the bar 1 is forced toward the bar 16, and by reversing the movement of said screw a separation of the bars is permitted. The proper spacing between such bars is maintained by means of a spring 22, fixed to the bar 1 and bearing against the bar 16.

In Fig. 4 is illustrated a glass plate 23 the edges of which have been chipped to form scallops 24, which result from breaking the edges of the glass with the tool herein shown and described. In use these edges are usually concealed by tin-foil or other ornamental material.

In operation, the tool is held in approximately the position shown in Fig. 2, the glass being preferably supported upon a solid object. The point 17 is then forced upwardly, breaking out a small piece of the glass in arc-shaped form, and leaving the wall of the fracture perfectly smooth. The operation is repeated until the entire edge of the plate is chipped, as shown in Fig. 4. The position of the end of the screw 10 is such as to be just within the edge of the break in the glass.

In order to work effectively it is necessary that the tool shall be held at a certain angle with relation to the glass, and if the tool is adjusted for a certain thickness of glass it cannot therefore be used successfully with one of another thickness, but the spacing of the bearing point and bit must be corrected. In tools heretofore used which were provided with fixed jaws, they could be used only with one thickness of glass, and for working with plates of differing thickness it was necessary to have different tools. It is obvious that this difficulty is overcome in the use of my device, which provides for three different adjustments,—one of the bar 1 longitudinally of the handle, one of the screw 10 in the end of the bar 1, and one of the bar 16 with reference to the bar 1, by operation of the screw 21. When it is desired to change the space between the bearing point and bit longitudinally of the tool the screw 9 is loosened and the nut 5 given the desired operation, whereupon the screw 9 is again tightened, locking the bar 1, handle 3, and bar 16 firmly together. If it is desired to vary the space between the bearing point and bit in the opposite direction the nuts 12 and 13 are loosened, the screw 10 changed to the desired position, and the nuts tightened again. For a slight adjustment the screw 21 may be employed, permitting of a speedier operation.

The bar 16 is preferably formed of tool steel of a desired degree of temper. Such bar is not only interchangeable end for end, but if the same becomes worn or broken it can quickly be replaced with a new bar, whereas if a tool with fixed jaws becomes inoperative it is necessary to procure a new tool.

By the use of the tool herein shown and described, with a little practice a person may become quite expert in the preparation of the scalloped plates, and can produce them quite expeditiously.

What I claim as my invention, and desire to secure by Letters Patent of the United States, is:

1. In a tool of the class described, a bar provided at one of its ends with a bearing point; a bar attached thereto and provided at one of its ends with a chipping point in proximity to said bearing point; means for adjustment of said bars longitudinally of each other; and means for adjustment of said bars toward or from each other, to cause a lateral separation of the bearing point and chipping point.

2. In a device of the class described, a suitable handle; a bar slidable therein; a bearing point vertically adjustable in the end of said bar; means for adjustment of said bar with reference to said handle, longitudinally thereof; means for locking said bar in adjusted positions; an auxiliary bar connected with said handle, held in parallel relation with said first named bar, and provided with a glass chipping point in proximity to said bearing point.

3. In a device of the class named, a handle, a bar slidable therein; means for holding said bar in adjustable positions with reference to said handle; a screw in that end of said bar opposite to said handle; means for holding said screw in adjusted positions; and a bar held in parallel relation to said first-named bar, and provided with a glass-chipping point in proximity to said screw.

4. In a device of the class described, a bar provided at one of its ends with an adjustable bearing point; an auxiliary bar connected with said first named bar at the end opposite to said bearing-point and provided with a glass-chipping point in proximity thereto; means embodied in the connecting means of said bars for permitting an adjustment thereof longitudinally of each other; a connecting member for the operating ends of said bars, provided with means of adjustment of said bars toward or from each other; and means for retaining a suitable spacing between said bars.

5. In a device of the class named, a bar provided at one of its ends with an adjustable bearing point; a clamp slidable on said bar and capable of being locked thereto; a housing, slidable on said bar; and an auxiliary bar removably held in said clamp and housing in parallel relation to said first-named bar, and provided at its ends with glass-chipping points, so as to be interchangeably secured in said clamp and housing.

In testimony whereof I affix my signature in presence of two witnesses.

WILLIAM SPANGLER.

Witnesses:
W. N. HASKELL,
FRANK W. HASKELL.

Copies of this patent may be obtained for five cents each, by addressing the "Commissioner of Patents, Washington, D. C."